(12) United States Patent
Lagergren

(10) Patent No.: US 8,365,157 B2
(45) Date of Patent: Jan. 29, 2013

(54) SYSTEM AND METHOD FOR EARLY PLATFORM DEPENDENCY PREPARATION OF INTERMEDIATE CODE REPRESENTATION DURING BYTECODE COMPILATION

(75) Inventor: Marcus Lagergren, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 1471 days.

(21) Appl. No.: 11/876,398

(22) Filed: Oct. 22, 2007

(65) Prior Publication Data

US 2008/0115119 A1 May 15, 2008

Related U.S. Application Data

(60) Provisional application No. 60/857,999, filed on Nov. 9, 2006.

(51) Int. Cl.
*G06F 9/45* (2006.01)
(52) U.S. Cl. ......... 717/148; 717/146; 717/147; 717/153
(58) Field of Classification Search .................. 717/146, 717/148, 152, 153, 147
See application file for complete search history.

(56) References Cited

U.S. PATENT DOCUMENTS

| | | | | |
|---|---|---|---|---|
| 6,317,872 B1* | 11/2001 | Gee et al. | ...................... | 717/152 |
| 7,117,488 B1* | 10/2006 | Franz et al. | ................... | 717/144 |
| 7,793,275 B2* | 9/2010 | Bobrovsky et al. | ........... | 717/148 |
| 2002/0138819 A1* | 9/2002 | Hills | .............................. | 717/114 |
| 2004/0268328 A1* | 12/2004 | Plesko et al. | .................. | 717/141 |

OTHER PUBLICATIONS

Zuck et al., "A Translation Validator for Optimizing Compilers", 2002.*
Burke et al., "The Jalapeno Dynamic Optimizing Compiler for Java", 1999.*
Eeckhout et al., "How Java Programs Interact with Virtual Machines at the Microarchitectural Level", 2003.*
Su et al., "Speculative Optimization Using Hardware-Monitored Guarded Regions for Java Virtual Machines", 2007, ACM.*
Zhao et al., "Lazy Interprocedural Analysis for Dynamic Loop Parallelization", 2006.*
Staffan Friberg, "Dynamic Profile Guided Optimization in a VEE on IA-64", 2004.*

* cited by examiner

*Primary Examiner* — Phillip H Nguyen
(74) *Attorney, Agent, or Firm* — Fliesler Meyer LLP

(57) ABSTRACT

A system and method for early platform dependency preparation of intermediate code representation during bytecode compilation in a virtual machine (VM), or other runtime environment, and particularly for use in a system that includes a Java Virtual Machine (JVM). Current techniques for separating the platform dependent intermediate representation from the platform independent intermediate representation using a watertight abstraction layer gives non-optimal side effects (such as compiler source code duplication or inefficiency in the generated code). Embodiments of the present invention enable the compiler to construct platform dependent idioms using medium level intermediate code, and maintain the platform dependent construct all the way to the final native code.

16 Claims, 2 Drawing Sheets

SYSTEM AND METHOD FOR EARLY PLATFORM DEPENDENCY PREPARATION OF INTERMEDIATE CODE REPRESENTATION DURING BYTECODE COMPILATION

CLAIM OF PRIORITY

This application claims priority from provisional application "SYSTEM AND METHOD FOR EARLY PLATFORM DEPENDENCY PREPARATION OF INTERMEDIATE CODE REPRESENTATION DURING BYTECODE COMPILATION", Application No. 60/857,999, filed Nov. 9, 2006, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is generally related to virtual machine environments and other runtime environments, and in particular to a system and method for improving compiler efficiency by introducing platform dependencies earlier in the compilation process.

BACKGROUND

Virtual machine (VM) environments are abstract computer environments that allow for portability of software between different underlying computer architectures. The VM is itself a complex software product that is implemented upon a particular computer hardware platform and/or operating system. The VM then provides a uniform layer of abstraction between the hardware platform and any compiled software applications that will run thereon. Virtual machines are essential for the portability of certain technologies, including Java programs. The Java Virtual Machine (JVM) allows compiled Java programs to be run on the virtual machine or JVM, independently of whatever underlying hardware or operating system is used. Examples of currently available JVM products include the Sun Java Virtual Machine from Sun Microsystems, Inc., and the JRockit Virtual Machine from BEA Systems, Inc.

A real CPU understands and executes instructions that are native to that CPU (commonly called native code). In comparison, a virtual machine understands and executes virtual machine instructions (commonly called bytecode). A virtual machine almost always run on a real CPU executing native code. The core of a virtual machine is normally implemented in a language such as C, that is then always compiled to native code using an OS/CPU compatible compiler.

A virtual machine can implement different strategies of how to execute the byte codes. If the virtual machine analyzes each bytecode separately and does this every time the same bytecode is executed, then the virtual machine is said to be an interpreter. If instead the virtual machine translates the bytecode into native code once, and then the native code is used every time the same bytecode is executed, then the virtual machine is said to be a just-in-time compiler (commonly called a JIT).

Some virtual machines contain both an interpreter and a JIT. In the case of Java Virtual Machines, the Sun Java Virtual Machine will initially use the interpreter when executing Java bytecode. When the Sun JVM subsequently detects bytecode that is executed often (commonly called a hot spot in the program) it will compile that part of the bytecode into native code. In contrast, the JRockit Virtual Machine will never interpret the Java bytecode. Instead, the JRockit JVM will always compile it to native code before executing it. If JRockit detects a hot spot in the program it will recompile that part of the bytecode again, but with more code optimizations. Such compiler techniques are described in the books "Advanced Compiler Design and Implementation" by Steven S. Muchnik; "Crafting a Compiler with C" by Charles N. Fischer and Richard J. LeBlanc, Jr.; and "Compilers" by Alfred V. Aho, Ravi Sethi, Jeffrey D. Ullman, each of which are incorporated herein by reference.

Java bytecode is not immediately usable as a high-level representation of the compiled application since the Java bytecode was not originally designed for this purpose. However, it is possible to transform the Java bytecode into a high-level intermediate representation (HIR) of the application suitable for a compiler because the Java bytecode is not as low-level as native machine code, and because most Java byte codes are generated with the same compiler (the javac compile from Sun Microsystems). Unfortunately, bytecode obfuscators are sometimes used, which makes it both difficult to automatically extract a proper HIR from the Java bytecode, and makes the compiled code less efficient.

The HIR contains trees with expressions that in turn contain subexpressions and which are evaluated recursively. Optimizations can be applied to the HIR, for example the use of pattern matching to detect common compiler generated idioms and to reduce these into simpler constructs. Standard compiler techniques then transform the HIR into a medium-level intermediate representation (MIR). Unlike the HIR, the MIR cannot contain expressions within expressions. The HIR to MIR transform flattens the trees and inserts variables for storage of the results of evaluated sub-expressions. Most optimizations are performed on the MIR. For example the MIR can be transformed into SSA (Single Static Assignment) form where a variable is only assigned once, and as a result the number of variables increase drastically. However many optimizations are easy to perform on SSA-MIR.

Finally, the MIR is transformed into a platform dependent low-level intermediate (LIR) representation where the limitations of the target CPU affects the opcodes. Since the compiler source code for optimizations performed on the HIR and the MIR is reused for all platforms, implementors delay the transformation into platform dependent code as long as possible for maximum source code reuse. When the compiler has reached the LIR all further optimizations are supposed to be tailored for each platform, if there are optimizations that are similar between platforms this will lead to source code duplication and less effective source code development and maintenance. This abstraction barrier between platform independent and platform independent code has been beneficial for traditional compiler design that has focused on C-compiles (and similar languages). However when compiling virtual opcodes for a JVM to different architectures it turns out that the watertight abstraction barrier can be a problem.

The following example is a MIR representation of a typical 64-bit OR bit operation with a variable and a constant:

OR x, 0x0000000100000000L→z

The above operation first ORs the variable x with the large constant, and then stores the result in variable z. The MIR optimizer can detect obvious cases where the constant is zero and remove the operation altogether, but this is not the case here. However if one assumes that the system is operating on a platform which only supports 32-bit registers and operations, then the transformation from MIR to LIR will split the OR into two 32-bit OR operations, and the two variables x and z will be split into four variables x_hi, x_lo, z_hi and z_lo. The constant will also need to be split. One might also be using a platform compatible with the Intel x86 CPU which requires that the destination is the same as the source. This will also introduce the need for temporary variables, for example tmp and tmp2 variables:

| 1 | MOV x_hi -> tmp |
| 2 | OR tmp, 0x00000001 -> tmp |
| 3 | MOV tmp -> z_hi |
| 4 | MOV x_lo -> tmp2 |
| 5 | OR tmp2, 0x00000000 -> tmp2 |
| 6 | MOV tmp2 -> z_lo |

5 OR tmp2, 0x00000000→tmp2
6 MOV tmp2→z_lo

In the above example, because step 5 involves a zero constant, the step is redundant and can be removed by the same kind of optimization normally performed on the MIR. This type of optimization is referred to as a strength reduction optimization.

The next step in the optimization process would be merge steps 4 and 6 into a single MOV x_lo→z_lo. This type of optimization is referred to as a copy propagation optimization.

A traditional compiler design must either reimplement the strength reduction and the copy propagation optimization in the platform dependent layer for each supported platform, (which involves unnecessary code duplication), or else ignore the strength reduction and copy propagation in the LIR (with the result being reduced efficiency).

In some instances it might be possible to create code that can work on any platform dependent LIR. However, this is just a workaround to the fundamental problem. Generating platform dependent code introduces new constructs that are suitable for higher-level optimizations. This has not been a large problem for traditional C-compilers since their fundamental variables are adapted to fit the platform for which they are compiling. For example the "int" is 32-bit on a 32-bit platform and 64-bit on a 64-bit platform. However, the Java bytecode is dependent on the JVM platform and the bit sizes are locked. As such it would be beneficial if bytecode compilers could consider platform dependencies earlier in the compilation process to better address these issues.

SUMMARY

Disclosed herein is a system and method for early platform dependency preparation of intermediate code representation during bytecode compilation in a virtual machine (VM), or other runtime environment, and particularly for use in a system that includes a Java Virtual Machine (JVM). Current techniques for separating the platform dependent intermediate representation from the platform independent intermediate representation using a watertight abstraction layer gives non-optimal side effects (such as compiler source code duplication or inefficiency in the generated code). Embodiments of the present invention enable the compiler to construct platform dependent idioms using medium level intermediate code, and maintain the platform dependent construct all the way to the final native code.

DETAILED DESCRIPTION

Disclosed herein is a system and method for early platform dependency preparation of intermediate code representation during bytecode compilation in a virtual machine (VM), or other runtime environment, and particularly for use in a system that includes a Java Virtual Machine (JVM). As described above, the current technique for separating the platform dependent intermediate representation from the platform independent intermediate representation using a watertight abstraction layer gives non-optimal side effects (like compiler source code duplication or inefficiency in the generated code). An embodiment of the present invention addresses this problem by providing a system and method to repeatedly expand medium-level intermediate representations (MIRs) that can be expressed as more detailed MIR tailored for a particular platform. In accordance with an embodiment, the system allows for efficient code generation in a virtual machine environment, comprising: a virtual machine for executing a software application; a memory space for use by the virtual machine in storing the application bytecode and the generated native code; and a bytecode compiler comprising a platform dependency MIR-to-MIR expander.

Figure 1:
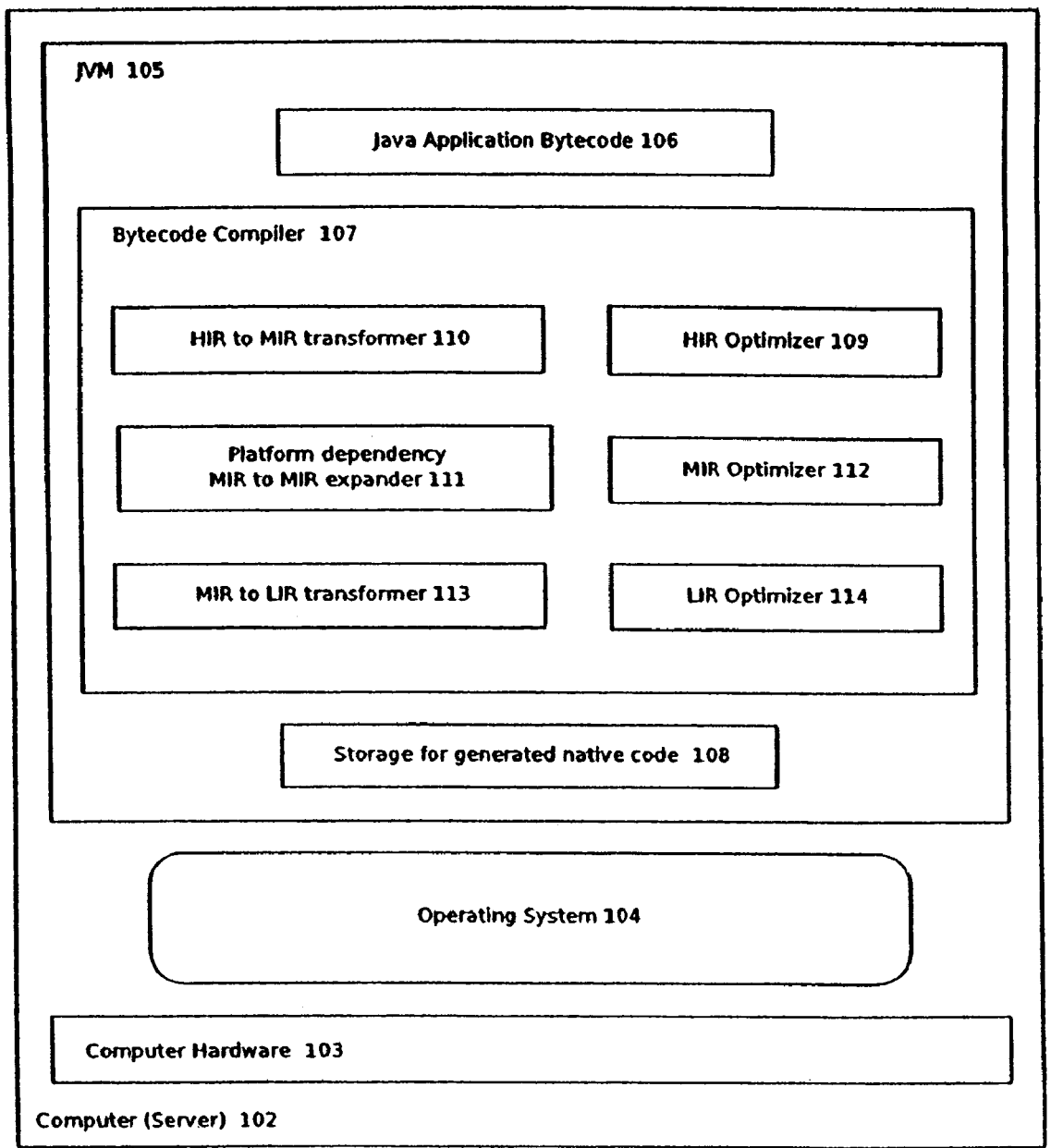
FIG. 1 shows an illustration of a system in accordance with an embodiment of the present invention, that early in the compilation process prepares the intermediate code representation for platform dependency to achieve better optimizations.

FIG. 1 shows an illustration of a system in accordance with an embodiment of the present invention, that uses thread local heaps in combination with a global heap. As shown in FIG. 1, the system 101 comprises a computer server 102 that further comprises a computer hardware 103. The computer hardware supports an operating system 104. Inside the Java Virtual Machine 105 (JVM) the application bytecode 106 is compiled using a bytecode compiler 107 into native code 108. The bytecode compiler 107 contains an HIR optimizer 109 that optimizes the high level intermediate representation of the application bytecode. The optimized HIR is then transformed into MIR using an HIR-to-MIR transformer 110 which flattens the HIR expressions and introduces temporary variables. The MIR is then examined by a platform dependency MIR-to-MIR expander 111 where MIR operations are expanded to be more adapted to the platform conventions of the operating system 104 and computer hardware 103. The resulting MIR is optimized using the MIR optimizer 112 and transformed into LIR using an MIR-to-LIR transformer 113. The LIR is optimized using the LIR optimizer 114, and the resulting native code is stored in the storage for generated native code 108.

Figure 2:
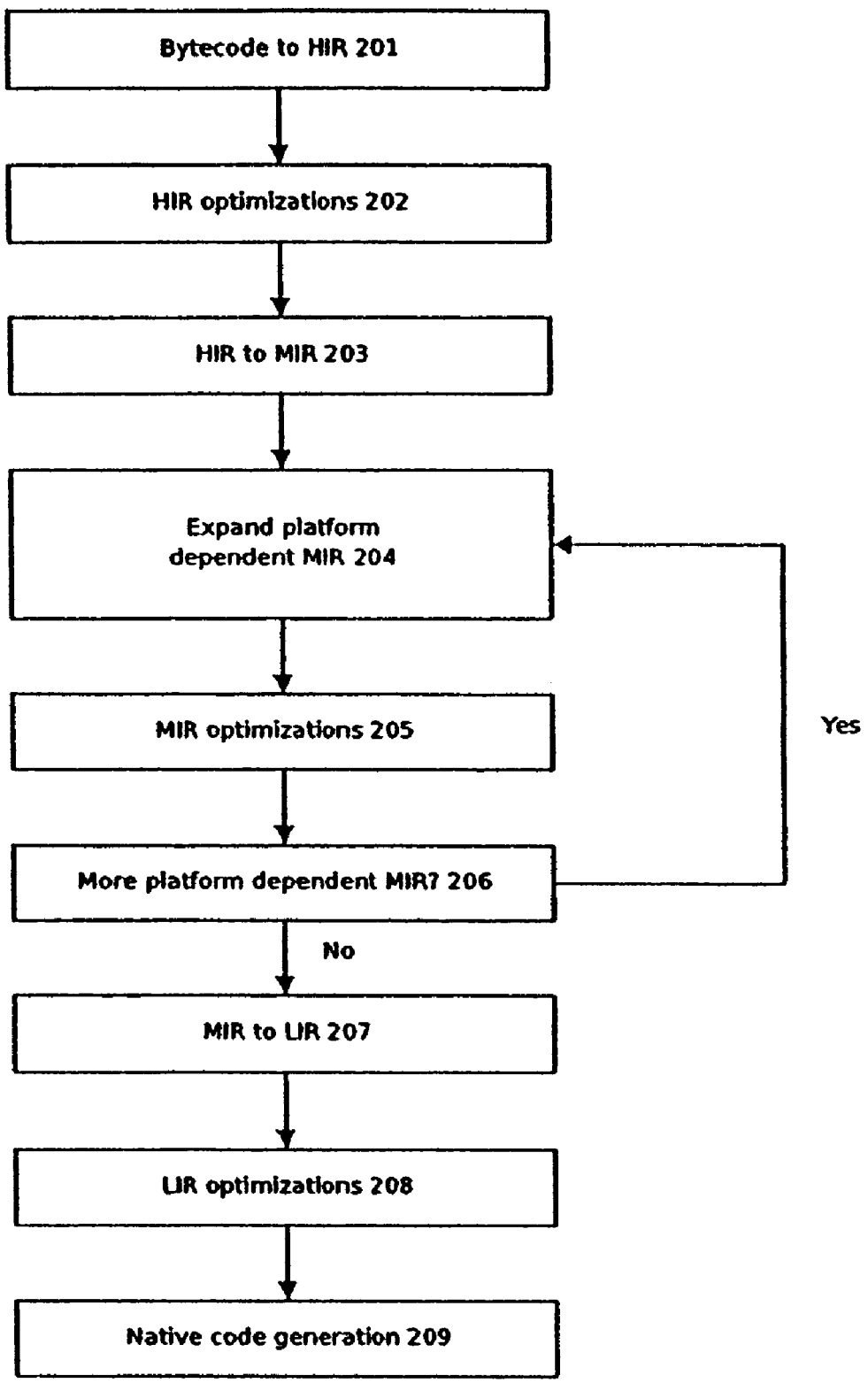
FIG. 2 shows a flowchart in accordance with an embodiment of the invention that illustrates the transformation process from bytecode to native code with early platform dependency preparation.

FIG. 2 shows a flowchart in accordance with an embodiment of the invention that illustrates the transformation process from bytecode to native code. As shown in FIG. 2, in step 201 the bytecode is transformed into a HIR. An example of such bytecode is shown below:

```
(i64)   lload_0
(i64)   ldc2_w #2;      //long 42949672961
(i64)   lor
``` which when transformed into HIR looks like:
 (i64) OR v1 4294967296→v2 (HIR Representation)

The HIR is then optimized, in step 202, using known HIR optimization techniques, which in this case do not affect the HIR. In step 203, the HIR is transformed into an MIR. In this example, the MIR will look the same as the HIR since there are no recursive sub-expressions:
 (i64) OR v1 4294967296→v2 (MIR Representation)

Without leaving the platform independent representation, in step 204 the MIR is expanded to be better prepared for the future platform dependency:

```
(i32)   OR v5 0 -> v3         (Expanded MIR Representation)
(i32)   OR v6 1 -> v4
```

Next, in step 205, the MIR is optimized using strength reduction. The new MIR looks like that shown below:

```
(i32)   MOV v5 -> v3          (MIR after Strength Reduction)
(i32)   OR v6 1 -> v4
```

In this example, there are no more MIRs that can be expanded to prepare for future platform dependencies (step 206), so the process continues to the next step. In step 207, the MIR is transformed into an LIR. New moves and variables are introduced because of the limitations in the x86 compatible opcodes (for example, that the or-instruction destination has to be the same as the source). This platform dependency of the or-instruction could not have been introduced at the MIR level—one reason being that it would not give any advantage, since the only relevant optimization already exists for the LIR, i.e. copy propagation. Furthermore, it is not possible to enter SSA form if the destination has to be the same as the source.

```
(i32)   x86_mov v5 -> v3      (LIR Representation
(i32)   x86_mov v6 -> v7       with Source and
(i32)   x86_or v7 1 -> v7         Destination same)
(i32)   x86_mov v7 -> v4
```

In step 208, the LIR optimizations are then performed. In this example the optimization is a copy propagation, which results in the following LIR:

```
(i32)   x86_mov v6 -> v4
(i32)   x86_or v4 1 -> v4
```

In the example shown above, the variable v3 was removed because it was used in the place of the variable v5 later in the code. In the final step 209, the LIR is transformed into native code. This step is where register allocation takes place. The variable v5 is then stored into the EAX register, and the variable v4 is stored into the EDX register, so that the resulting assembly code becomes:
 (i32) x86 or edx 1→edx Another, more complex example, is a call to the abs function, shown below:

```
(i64)   lload_0
(i64)   invokestatic #2;    //Method java/lang/Math.abs:(J)J
```

Which is converted into the following HIR:
 (i64) abs v1→v2

No further HIR optimizations can take place at this point. The HIR is then transformed into an MIR, which in this example looks the same:
 (i64) abs v1→v2

However, the abs function is suitable for early preparation of platform dependency because the current platform does not have an abs function in hardware. After the MIR has been expanded it will look like the following:

```
(i64)   sar v1 63 -> v3
(i64)   xor v1 v3 -> v4
(i64)   sub v4 v3 -> v2
```

As can be seen from the above examples, embodiments of the present invention enable the compiler programmer to encode certain platform dependencies using MIR code instead of LIR code. For many operations this reduces the time it takes for a programmer to generate a compiler backend for a new platform. Now the arithmetic right shift must be expanded to be more platform-dependent. Other operations that also are expanded are XOR and subtract (v1 is split into v5 and v6, v3 is split into v7 and v8, v4 is split into v11 and v12, v2 is split into v13 and v14.):

```
(i32)   mov     v5 -> v9
(i32)   mov     v6 -> v10
(i32)   shrd    v9 v10 63 -> v9
(i32)   sar     v10 31 -> v10
(i32)   mov     v10 -> v9
(i32)   mov     v9 -> v7
(i32)   mov     v10 -> v8
(i32)   xor     v5 v7 -> v11
(i32)   xor     v6 v8 -> v12
(i32)   sub     v11 v7 -> v13
(i32)   mov     v12 -> v15
(i32)   sbb     v15 v8 -> v15
(i32)   mov     v15 -> v14
```

The MIR has now been prepared as much as possible for x86 platform dependency. Since the process is still working with the MIR, the full spectrum of MIR optimizations are still available to the compiler. These optimizations can include, for example, strength reduction, constant propagation, copy propagation, inlineing, locking optimizations, escape analysis, and object explosion. In the examples described above, the more advanced optimizations are not performed because of the limited amount of instructions to work on. As the MIR is transformed into LIR, the following is created:

```
(i32)   x86_mov     v5 -> v9
(i32)   x86_mov     v6 -> v10
(i32)   x86_shrd    v9 v10 63 -> v9
(i32)   x86_sar     v10 31 -> v10
```

| | | |
|---|---|---|
| (i32) | x86_mov | v10 -> v9 |
| (i32) | x86_mov | v9 -> v7 |
| (i32) | x86_mov | v10 -> v8 |
| (i32) | x86_mov | v5 -> v16 |
| (i32) | x86_xor | v16 v7 -> v16 |
| (i32) | x86_mov | v16 -> v11 |
| (i32) | x86_mov | v6 -> v17 |
| (i32) | x86_xor | v17 v8 -> v17 |
| (i32) | x86_mov | v17 -> v12 |
| (i32) | x86_mov | v11 -> v18 |
| (i32) | x86_sub | v18 v7 -> v18 |
| (i32) | x86_mov | v18 -> v13 |
| (i32) | x86_mov | v12 -> v15 |
| (i32) | x86_sbb | v15 v8 -> v15 |
| (i32) | x86_mov | v15 -> v14 |

The LIR is then further optimized using copy propagation and then register allocation into:

| | | |
|---|---|---|
| (i32) | x86_mov | edx -> ecx |
| (i32) | x86_sar | ecx 31 -> ecx |
| (i32) | x86_xor | eax ecx -> eax |
| (i32) | x86_xor | edx ecx -> edx |
| (i32) | x86_sub | eax ecx -> eax |
| (i32) | x86_sbb | edx ecx -> edx |

(wherein the EDX register contains the high 32-bit bits, and the EAX register contains the low 32-bit bits).

As will be seen from the above example, embodiments of the present invention simplify the work for the compiler programmer, since the transformation of MIR code into platform dependency can be written using other MIR operations. For example, the system allows expansion of a single 64-bit operation into several 32-bit operations, and expansion of mathematical constructs that do not have a hardware implementation (for example, the abs operation). Another use of the present invention is that whenever an expansion uses the MOV instruction it should use a MIR level MOV The programmer thus avoids having to specify exactly what kind of MOV (i.e. floating point, integer, etc.) is to be used.

Embodiments of the present invention also expand MIR operations for platform dependency by implementing a MIR operation using simpler MIR operations. Expansion loops are avoided by always rewriting into simpler operations. Only those platform dependencies that survive MIR optimizations are subject to early platform dependency preparation.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic or JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for early platform dependency preparation of intermediate code representation during bytecode compilation, comprising:
   a computer server, including a computer hardware, operating system, storage, and virtual machine;
   an application bytecode that is received at the computer server for execution thereon; and
   a bytecode compiler that executes on the computer server to receive the application bytecode and compile the application bytecode into resulting native code, wherein the bytecode compiler contains
      a logic that transforms the bytecode into a high-level intermediate representation (HIR),
      a logic that optimizes and then transforms the HIR into a medium-level intermediate representation (MIR),
      a MIR-to-MIR expander that recursively expands the MIR, so that MIR operations therein are adapted to platform conventions of the operating system and the computer hardware, including
         determining those MIR that can be expressed as a more detailed MIR,
         expanding those MIR to be more adapted to the platform conventions of the particular platform including the operating system and the computer hardware,
         optimizing the expanded MIR using a strength reduction method and one or more constant propagation, copy propagation, inlining, locking, escape analysis, or object explosion optimizations, and
         repeating the determining, expanding and optimizing steps for one or more additional MIR,
      a MIR-to-LIR transformer that transforms the MIR resulting from the MIR-to-MIR expansion into a low-level intermediate representation (LIR), and
      transforming the LIR into the native code prior to storing the resulting native code in the storage of the computer server for subsequent use by the system.

2. The system of claim 1 further comprising:
an HIR optimizer that optimizes the high level intermediate representation (HIR) of the application bytecode prior to transforming the HIR to the MIR.

3. The system of claim 1 further comprising:
an MIR optimizer that optimizes the MIR prior to communicating the MIR to MIR-to-MIR expander.

4. The system of claim 1 further comprising:
an LIR optimizer that optimizes the LIR, prior to storing the resulting native code in the storage of the computer server.

5. The system of claim 1 wherein the virtual machine is a JVM and the bytecode is Java bytecode.

6. The system of claim 5 wherein the virtual machine is JRockit.

7. The system of claim 1, wherein the MIR is expanded without leaving its platform independent representation, in preparation for subsequent platform dependency optimizations.

8. A method for early platform dependency preparation of intermediate code representation during bytecode compilation, comprising the steps of:
providing a computer server, including a computer hardware, operating system, storage, and virtual machine;
receiving an application bytecode at the computer server for execution thereon; and
compiling the application bytecode into resulting native code by performing the steps of
transforming the bytecode into a high-level intermediate representation (HIR),
optimizing and then transforming the HIR into a medium-level intermediate representation (MIR),
expanding recursively the MIR, so that MIR operations therein are adapted to platform conventions of the operating system and the computer hardware, including
determining those MIR that can be expressed as a more detailed MIR,
expanding those MIR to be more adapted to the platform conventions of the particular platform including the operating system and the computer hardware,
optimizing the expanded MIR using a strength reduction method and one or more constant propagation method, copy propagation method, inlining, locking, escape analysis, or object explosion optimizations, and
repeating the determining, expanding and optimizing steps for one or more additional MIR,
transforming the MIR resulting from the MIR-to-MIR expansion into a low-level intermediate representation (LIR),
transforming the LIR into the native code, and
storing the resulting native code in the storage of the computer server for subsequent use by a system.

9. The method of claim 8 further comprising:
optimizing the high level intermediate representation (HIR) of the application bytecode prior to transforming the HIR to the MIR.

10. The method of claim 8 further comprising:
optimizing the MIR prior to communicating the MIR to MIR-to-MIR expander.

11. The method of claim 8 further comprising:
optimizing that optimizes the LIR, prior to storing the resulting native code in the storage of the computer server.

12. The method of claim 8 wherein the virtual machine is a JVM and the bytecode is Java bytecode.

13. The method of claim 12 wherein the virtual machine is JRockit.

14. The method of claim 8, wherein the MIR is expanded without leaving its platform independent representation, in preparation for subsequent platform dependency optimizations.

15. A non-transitory computer readable medium, including instructions stored thereon which when read and executed by one or more computers cause the one or more computers to perform the steps comprising:
receiving, at a computer server, including a computer hardware, operating system, storage, and virtual machine, an application bytecode for execution thereon; and
compiling the application bytecode into resulting native code by performing the steps of
transforming the bytecode into a high-level intermediate representation (HIR),
optionally optimizing and then transforming the HIR into a medium-level intermediate representation (MIR),
expanding recursively the MIR, so that MIR operations therein are adapted to platform conventions of the operating system and the computer hardware, including
determining those MIR that can be expressed as a more detailed MIR,
expanding those MIR to be more adapted to the platform conventions of the particular platform including the operating system and the computer hardware,
optimizing the expanded MIR using a strength reduction method and one or more constant propagation, copy propagation, inlining, locking, escape analysis, or object explosion optimizations, and
repeating the determining, expanding and optimizing steps for one or more additional MIR,
transforming the MIR resulting from the MIR-to-MIR expansion into a low-level intermediate representation (LIR),
transforming the LIR into the native code, and
storing the resulting native code in the storage of the computer server for subsequent use by a system.

16. The non-transitory computer readable medium of claim 15 wherein the virtual machine is a JVM and the bytecode is Java bytecode.

* * * * *

UNITED STATES PATENT AND TRADEMARK OFFICE
CERTIFICATE OF CORRECTION

PATENT NO. : 8,365,157 B2
APPLICATION NO. : 11/876398
DATED : January 29, 2013
INVENTOR(S) : Lagergren It is certified that error appears in the above-identified patent and that said Letters Patent is hereby corrected as shown below:

In the Specifications:

In column 3, line 24-25, above "In the above example," delete "5 OR tmp2, 0x00000000→tmp2 6 MOV tmp2→z_lo".

In column 6, line 56, delete "inlineing," and insert -- inlining, --, therefor.

In the Claims:

In column 10, line 25, in Claim 15, delete "optionally optimizing" and insert -- optimizing --, therefor.

Signed and Sealed this
Twenty-eighth Day of May, 2013

Teresa Stanek Rea
*Acting Director of the United States Patent and Trademark Office*